(12) United States Patent
Kim

(10) Patent No.: US 10,481,630 B2
(45) Date of Patent: Nov. 19, 2019

(54) PEDAL EFFORT GENERATION DEVICE FOR VEHICLE

(71) Applicants: Hyundai Motor Company, Seoul (KR); Kia Motors Corporation, Seoul (KR)

(72) Inventor: Eun Sik Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 15/832,026

(22) Filed: Dec. 5, 2017

(65) Prior Publication Data

US 2019/0129462 A1 May 2, 2019

(30) Foreign Application Priority Data

Oct. 31, 2017 (KR) .......................... 10-2017-0143288

(51) Int. Cl.
*G05G 5/03* (2008.04)
*B60K 23/02* (2006.01)
(Continued)

(52) U.S. Cl.
CPC .............. *G05G 5/03* (2013.01); *B60K 23/02* (2013.01); *B60T 7/042* (2013.01); *F16H 25/186* (2013.01);
(Continued)

(58) Field of Classification Search
CPC .. G05G 1/46; G05G 1/44; G05G 1/38; G05G 1/30; G05G 5/03; G05G 5/05;
(Continued)

(56) References Cited

U.S. PATENT DOCUMENTS 5,970,817 A * 10/1999 Ichiba ....................... B60T 7/06
74/512
7,950,275 B2 * 5/2011 Isono ..................... B60T 7/042
73/132

(Continued)

FOREIGN PATENT DOCUMENTS

FR 3015063 A1 * 6/2015 ............... G05G 5/03

*Primary Examiner* — Daniel D Yabut
(74) *Attorney, Agent, or Firm* — Mintz Levin Cohn Ferris Glovsky and Popeo, P.C.; Peter F. Corless

(57) ABSTRACT

A pedal effort generation device for a vehicle includes: a pedal arm rotatably mounted on a pedal member in a front and rear direction; a connection link having one end at a rear side of the connection link hinged to the pedal arm; a rotating cylinder connected with the other end of the connection link and rotatably mounted on the pedal member; a follower unit mounted on the rotating cylinder, slidably coupled to the other end of the connection link, and configured to convert linear motion of the connection link into rotational motion of the rotating cylinder according to a front rotation of the pedal arm; and an elastic mechanism connected with the pedal member and the rotating cylinder, elastically deformed upon a forward rotation of the rotating cylinder according to the front rotation of the pedal arm, and configured to provide a reverse restoring force to the rotating cylinder and the pedal arm with an accumulated elastic force.

15 Claims, 12 Drawing Sheets

(51) Int. Cl.
    *B60T 7/04*         (2006.01)
    *F16H 25/18*      (2006.01)
    *G05G 1/44*       (2008.04)
    *F16F 1/18*       (2006.01)

(52) U.S. Cl.
    CPC ........ *G05G 1/44* (2013.01); *B60Y 2400/3012* (2013.01); *F16F 1/18* (2013.01); *G05G 2505/00* (2013.01)

(58) Field of Classification Search
    CPC ......... B60K 26/021; B60K 23/02; B60T 7/04; B60T 8/4086; F16H 25/186
    See application file for complete search history.

(56) References Cited

U.S. PATENT DOCUMENTS

| | | | |
|---|---|---|---|
| 8,505,409 B2 * | 8/2013 | Isono | B60T 7/042 74/512 |
| 8,746,095 B2 * | 6/2014 | Isono | B60T 7/042 74/512 |
| 9,561,786 B2 | 2/2017 | Shand et al. | |
| 2001/0011487 A1 * | 8/2001 | Kojima | B60K 26/021 74/513 |
| 2002/0157495 A1 * | 10/2002 | Goto | B60T 7/06 74/512 |
| 2007/0000345 A1 * | 1/2007 | Leone | B60K 26/021 74/513 |
| 2010/0175497 A1 * | 7/2010 | Nozu | B60K 26/021 74/514 |

* cited by examiner (a)

(b)

(a)

(b)

(a)

(b)

(a)          (b)

PEDAL EFFORT GENERATION DEVICE FOR VEHICLE

CROSS-REFERENCE TO RELATED APPLICATION

This application claims the benefit of priority to Korean Patent Application No. 10-2017-0143288 filed in the Korean Intellectual Property Office on Oct. 31, 2017, the entire contents of which are incorporated herein by reference.

BACKGROUND OF THE DISCLOSURE (a) Technical Field

Embodiments of the present disclosure relate generally to a pedal system for a vehicle, and more particularly, to a pedal effort generation device for a vehicle capable of implementing a best pedal effort.

(b) Description of the Related Art

Generally, vehicles are provided with various types of pedals such as a brake pedal, an accelerator pedal, and a clutch pedal. The pedals are operated by a driver while the vehicle is running to change a running condition of the vehicle. Therefore, the pedal is directly linked with safety of the driver or of pedestrians.

The pedals are operated by the driver's foot, such that the driver may feel pedal efforts of various amounts depending on the force with which the driver steps on the pedal. Here, the pedal effort refers to a reaction force that is provided to the driver's foot when the driver steps on the pedal. The amount of the pedal effort applied to the driver's foot, that is, the force for stepping on the pedal, changes according to a position of the pedal as the driver steps on the pedal. The pedal effort varies depending on the kind of pedal, but is determined based on the pedal's weight and length, a shape of a pedal arm, a natural elastic property value of a spring elastically supporting the pedal, and the like. As an example, if a driver steps on the pedal slowly, the driver's foot experiences a gradually increasing pedal effort as the pedal rotates.

Recently, devices for generating a brake pedal effort have been applied to hybrid vehicles and vehicles utilizing an electronic clutch (E-clutch). In conventional vehicles, a clutch pedal is operated to generate a hydraulic pressure. However, since the electronic clutch as described above is operated by operating an actuator using an electronic signal, a pedal effort generation device capable of providing a feeling of operating the pedal to the driver is necessary.

Furthermore, in recent years, there has been a demand for the ability to change a pedal effort profile to freely adjust a pedal effort according to the driver's taste, preference, etc. However, since the structure of the pedal device needs to be changed to change the pedal effort profile, such an installation can be costly.

Conventionally, an active pedal device capable of controlling a pedal effort profile or the amount of pedal effort provided when a driver steps on a pedal. However, since the conventional active pedal devices use expensive components, manufacturing costs are often high, and marketability may deteriorate as the pedal effort profile deteriorates over time.

The above information disclosed in this Background section is only for enhancement of understanding of the background of the disclosure, and therefore, it may contain information that does not form the related art.

SUMMARY OF THE DISCLOSURE

The present disclosure has been made in an effort to provide a pedal effort generation device for a vehicle capable of generating a best pedal effort with a simple configuration and capable of changing a pedal effort profile according to the driver's preference.

According to embodiments of the present disclosure, a pedal effort generation device for a vehicle includes: a pedal arm rotatably mounted on a pedal member in a front and rear direction; a connection link having one end at a rear side of the connection link hinged to the pedal arm; a rotating cylinder connected with the other end of the connection link and rotatably mounted on the pedal member; a follower unit mounted on the rotating cylinder, slidably coupled to the other end of the connection link, and configured to convert linear motion of the connection link into rotational motion of the rotating cylinder according to a front rotation of the pedal arm; and an elastic mechanism connected with the pedal member and the rotating cylinder, elastically deformed upon a forward rotation of the rotating cylinder according to the front rotation of the pedal arm, and configured to provide a reverse restoring force to the rotating cylinder and the pedal arm with an accumulated elastic force.

The pedal effort generation device may further include: a support bush fixedly mounted on the pedal member and rotatably supporting the rotating cylinder.

The rotating cylinder may have a cylinder shape with a front side and a rear side, ends of the front side and the rear side being open.

The other end of the connection link may be slidably coupled to the follower unit through the open end of the rear side of the rotating cylinder.

The open end of the front side of the rotating cylinder may be rotatably coupled to the support bush.

The open end of the front side of the rotating cylinder may be provided with at least one coupling protrusion positioned on an inner circumferential surface of the rotating cylinder.

A groove coupled to the at least one coupling protrusion may be formed on an outer circumferential surface of the support bush.

The groove may include: a first coupling groove coupled to the at least one coupling protrusion in a front and rear direction; and a second coupling groove coupled to the at least one coupling protrusion along an outer circumferential direction of the support bush.

The one end of the connection link may be hinged to the pedal arm by a hinge pin.

The other end of the connection link may be slidably coupled to the follower unit by a connection pin.

The follower unit may include geometry slots each provided at front and rear sides of the rotating cylinder with a phase difference of 180° and slidably coupled to front and rear ends of the connection pin.

The geometry slot may be formed as a generator having a predetermined curved pattern between an end portion of the front side of the rotating cylinder and an end portion of the rear side of the rotating cylinder.

The geometry slot may include: a first slot bent upwardly from an end of the rear side of the rotating cylinder, bent downwardly in a middle portion thereof, and again bent upwardly toward an end of the front side of the rotating cylinder, and a second slot bent downwardly from an end of the rear side of the rotating cylinder, bent upwardly in a middle portion thereof, and again bent downwardly toward an end of the front side of the rotating cylinder.

The elastic mechanism may include at least one leaf spring accumulating an elastic force while being elastically deformed upon a forward rotation of the rotating cylinder.

The elastic mechanism may include: an upper leaf spring having one end connected with an upper part of one side of the pedal member and another end connected with one side of the rotating cylinder corresponding to the other side of the pedal member; and a lower leaf spring having one end connected with a lower part of the other side of the pedal member and another end connected with another side of the rotating cylinder corresponding to the one side of the pedal member.

The upper leaf spring may be bent upwardly, and the lower leaf spring may be bent downwardly.

Furthermore, according to embodiments of the present disclosure, a pedal effort generation device for a vehicle includes: a pedal arm rotatably mounted on a pedal member in a front and rear direction; a connection link having one end at a rear side of the connection link hinged to the pedal arm; a rotating cylinder connected with the other end of the connection link and rotatably mounted on the pedal member; a follower unit mounted on the rotating cylinder, slidably coupled to the other end of the connection link, and configured to convert linear motion of the connection link into rotational motion of the rotating cylinder according to a front rotation of the pedal arm; an elastic mechanism connected with the pedal member and the rotating cylinder, elastically deformed upon a forward rotation of the rotating cylinder according to the front rotation of the pedal arm, and configured to provide a reverse restoring force to the rotating cylinder and the pedal arm with an accumulated elastic force; and a rotation angle detecting sensor mounted on the pedal member, configured to detect a rotation angle of the rotating cylinder, and configured to output a detection signal to a controller.

The rotation angle detecting sensor may be provided on the support bush and the at least one coupling protrusion may be provided as a magnetic body.

The rotation angle detecting sensor may include a hall sensor.

According to embodiments of the present disclosure, the best pedal effort can be generated with the simple configuration including the connection link, the rotating cylinder, and the geometry slot, thereby saving the manufacturing costs of the pedal unit and improving the operability of the pedal unit.

In addition, according to embodiments of the present disclosure, the pedal effort profile can be simply changed according to the driver's preference by variously modifying the motion of the geometry slot provided in the rotating cylinder, thereby improving the marketability of the pedal unit and providing a customizable pedal only by the replacement of the rotating cylinder.

In addition, the effects which may be obtained or predicted by the embodiments of the present disclosure will be directly or implicitly disclosed in the detailed description of the embodiments of the present disclosure. That is, various effects which are predicted by the embodiments of the present disclosure will be disclosed in the detailed description to be described below.

BRIEF DESCRIPTION OF THE DRAWINGS

Since the accompanying drawings are provided only to describe embodiments of the present disclosure, it is not to be interpreted that the spirit of the present disclosure is limited to the accompanying drawings.

DESCRIPTION OF SYMBOLS

Figure 1:
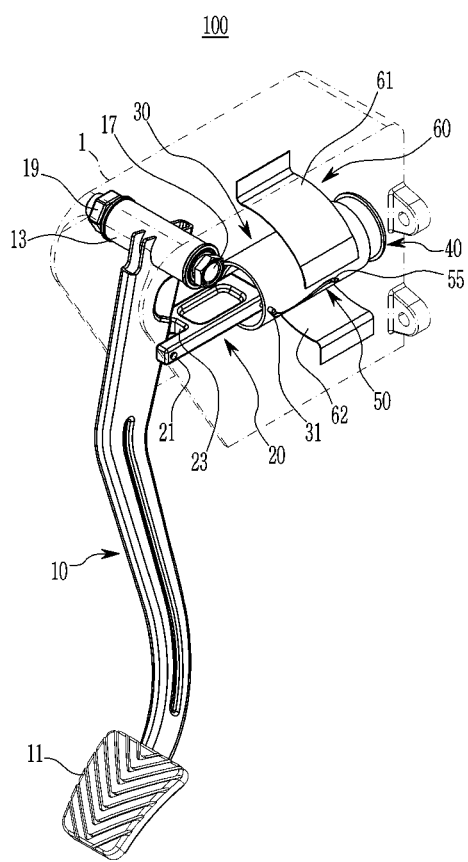
FIG. 1 is a coupled perspective view of a pedal effort generation device for a vehicle according to embodiments of the present disclosure.

1: Pedal member 3: Bolt hole
10: Pedal arm 11: Pedal pad
13: Hinge pipe 15: Hinge bush
17: Hinge bolt 19: Nut
20: Connection link 21: Hinge pin
23: Fitting groove 25, 26: First pin hole
29: Second pin hole 30: Rotating cylinder
31: Connection pin 35: Coupling protrusion
40: Support bush 41: First coupling groove
43: Second coupling groove 50: Follower unit
51: Geometry slot 53: First slot
55: Second slot 60: Elastic mechanism
61: upper leaf spring 62: lower leaf spring
80: Rotation angle detecting sensor 81: Hall sensor
90: Controller

DETAILED DESCRIPTION OF THE EMBODIMENTS

Hereinafter, the present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification.

However, since sizes and thicknesses of the respective components were arbitrarily shown in the accompanying drawings for convenience of explanation, the present disclosure is not necessarily limited to contents shown in the accompanying drawings. In addition, thicknesses were exaggerated in order to obviously represent several portions and regions.

In the following detailed description, the same components are classified into first, second, and the like to differentiate names for components and a sequence thereof is not necessarily limited thereto.

The terminology used herein is for the purpose of describing particular embodiments only and is not intended to be limiting of the disclosure. Throughout the specification, unless explicitly described to the contrary, "comprising" any components will be understood to imply the inclusion of other elements rather than the exclusion of any other elements. In addition, the terms "~unit", "~means", "~part", etc., described in the specification mean units of a comprehensive configuration for performing at least one function and operation. It will be further understood that the singular forms "a," "an," and "the" are intended to include the plural forms as well, unless the context clearly indicates otherwise. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 2:
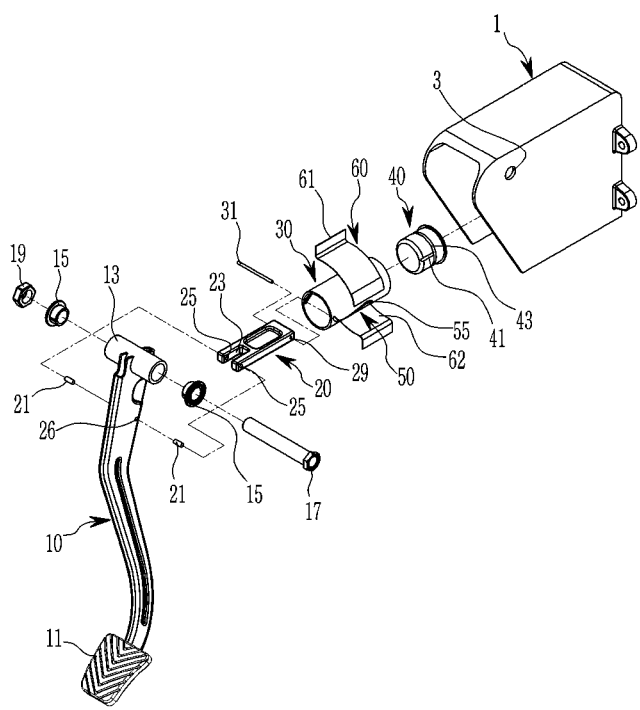
FIG. 2 is an exploded perspective view of the pedal effort generation device for a vehicle according to embodiments of the present disclosure.
Figure 3:
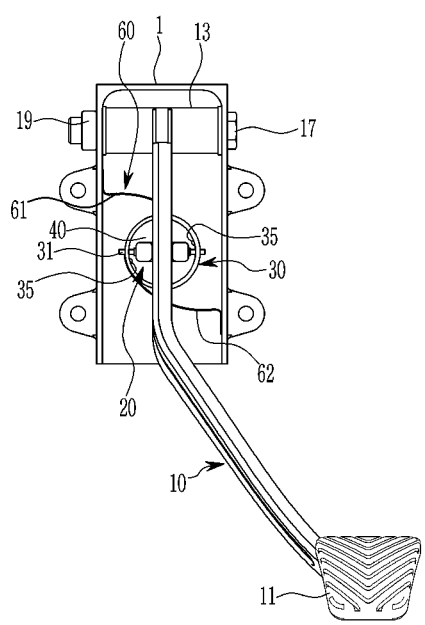
FIG. 3 is a front configuration diagram of the pedal effort generation device for a vehicle according to embodiments of the present disclosure.
Figure 4:
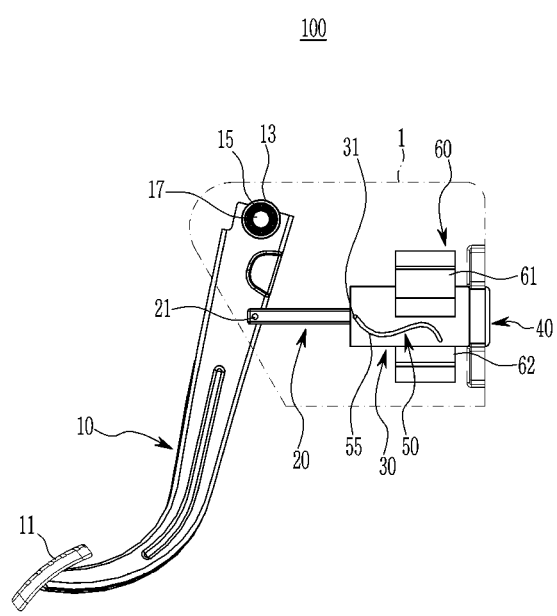
FIG. 4 is a side configuration diagram of the pedal effort generation device for a vehicle according to embodiments of the present disclosure.

Referring now to embodiments of the present disclosure, FIG. 1 is a coupled perspective view of a pedal effort generation device for a vehicle according to embodiments of the present disclosure, FIG. 2 is an exploded perspective view of FIG. 1, FIG. 3 is a front configuration diagram of FIG. 1, and FIG. 4 is a side configuration diagram of FIG. 1.

As shown in FIGS. 1 to 4, a pedal effort generation device 100 for a vehicle according to embodiments of the present disclosure may be operated by a driver while a vehicle is running to be applied to various pedal units for changing a running condition of the vehicle.

The pedal effort generation device 100 for a vehicle provides a pedal effort to a pedal to provide a driver with a best operation feeling. For example, the pedal effort generation device 100 may be applied to a brake pedal unit, an accelerator pedal unit, and a clutch pedal unit. Furthermore, the pedal effort generation device 100 for a vehicle may also be applied to a pedal unit of an electronic clutch (E-clutch) capable of operating an actuator with an electronic signal to operate a clutch.

The pedal effort generation device 100 for a vehicle according to embodiments of the present disclosure has a structure capable of generating a best pedal effort with a simple configuration. In addition, the pedal effort generation device 100 for a vehicle capable of simply changing a pedal effort profile according to a driver's preference according to the exemplary embodiment of the present disclosure is provided.

To this end, the pedal effort generation device 100 for a vehicle according embodiments of the present disclosure basically includes a pedal arm 10, a connection link 20, a rotating cylinder 30, a support bush 40, a follower unit 50, and an elastic mechanism 60, and each component will be described below.

According to embodiments of the present disclosure, the pedal arm 10 includes the pedal pad 11 that a driver may step on with his/her foot. The pedal arm 10 is rotatably mounted on a pedal member 1 in a front and rear direction.

Here, the pedal member 1 is a pedal housing for mounting components of the present apparatus 100, and is fixedly installed on a vehicle body panel in the front and rear direction (i.e., front and rear direction of a vehicle body).

The components of the present apparatus 100 is provided in the front and rear direction of the vehicle body. Hereinafter, the front may be defined as a front side of the vehicle body and the rear may be defined as a rear side of the vehicle body. As described above, the pedal member 1 has both side surfaces, an upper surface, and a front surface, and is provided as a pedal housing of which the rear side and the lower side are open.

Various components to be described below are provided on the pedal member 1, and therefore the pedal member 1 may include various subsidiary elements, such as a bracket, a plate, a block, and a collar, for supporting the components.

However, the above-mentioned subsidiary elements are for mounting each component to be described below on the pedal member 1. Therefore, according to embodiments of the present disclosure, various subsidiary elements are collectively referred to as the pedal member 1, except for the exceptional case.

The pedal arm 10 is rotatably coupled to an upper part of a rear side of the pedal member 1 in the front and rear direction by a hinge pipe 13, a hinge bush 15, and a hinge bolt 17. Both side surfaces of an upper part of the rear side of the pedal member 1 are provided with a bolt hole 3.

The hinge pipe 13 is fixedly mounted at an upper end of the pedal arm 10 in a lateral direction of the pedal arm 10. The hinge bushes 15 are rotatably fitted in both ends of the hinge pipe 13, respectively. The hinge bolt 17 is coupled with a nut 19 by penetrating through the bolt hole 3, the hinge bush 15, and the hinge pipe 13 of the pedal member 1. Accordingly, the pedal arm 10 and the hinge pipe 13 may rotate in the front and rear direction with respect to the hinge bush 15 and the hinge bolt 17.

The connection link 20 is hinged to the pedal arm 10 and is disposed along the front and rear direction, and one end of the rear side of the connection link 20 is hinged to the pedal arm 10 by the hinge pin 21.

One end of the rear side of the connection link 20 is provided with a fitting groove 23 that is coupled to the end part of a front side of the pedal arm 10. The fitting groove 23 is formed between both forks at one end of the rear side of the connection link 20, and first pin holes 25 and 26 in which the hinge pin 21 is fitted are each provided at both forks and the end portion of the front side of the pedal arm 10. Therefore, one end of the rear side of the connection link 20 may be hinged to the end portion of the front side of the pedal arm 10 by the hinge pin 21 fitted in the first pin holes 25 and 26. The hinge pin 21 is provided in a bolt type not to be separated from the first pin holes 25 and 26 and may be coupled to a nut, and both ends thereof may suffer from riveting processing and may also be fixed to both forks by a fixed key.

Here, the connection link 20 linearly moves forward when the pedal arm 10 rotates (hereinafter, referred to as "front rotation" for convenience) from the rear toward the front, and the connection link 20 linearly moves backward when the pedal arm 10 rotates (hereinafter, referred to as "rear rotation" for convenience) from the front to the rear and returns.

According to embodiments of the present disclosure, the rotating cylinder 30 is connected with the other end of a front side of the connection link 20, and mounted on the pedal member 1 to rotate in both directions (i.e., forward and backward). The rotating cylinder 30 is provided in a cylinder shape in which both ends are open.

The other end of the front side of the connection link 20 as described above may be slidably coupled to the follower unit 50 to be described below in detail through an open end of the rear side of the rotating cylinder 30.

Specifically, the other end of the front side of the connection link 20 may be slidably coupled to the follower unit 50 by a connection pin 31. The connection pin 31 is fixed by being fitted in a second pin hole 29 provided at the other end of the front side of the connection link 20. The connection pin 31 is provided in a bolt type not to be separated from the second pin hole 29 and may be coupled to the nut, and both ends thereof may suffer from the riveting processing and may also be fixed to the other end of the front side of the connection link 20 by the fixed key.

Meanwhile, an open end of a front side of the rotating cylinder 30 may be rotatably coupled to the support bush 40 to be described below in detail.

According to embodiments of the present disclosure, the support bush 40 fixes the rotating cylinder 30 so that the rotating cylinder 30 is not separated from the pedal member 1 and rotatably supports the rotating cylinder 30, and is provided in a block form having a circular cross section. The support bush 40 is fixedly mounted on a front surface of an inner side of the pedal member 1, and coupled to an open end of a front side of the rotating cylinder 30.

Figure 5A:
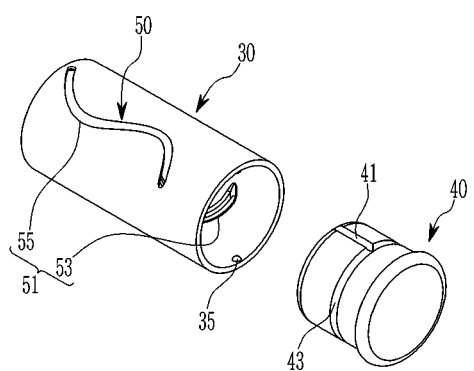
FIGS. 5A to 5C are diagrams illustrating a coupling structure of a rotating cylinder and a support bush applied to the pedal effort generation device for a vehicle according to embodiments of the present disclosure.
Figure 5B:
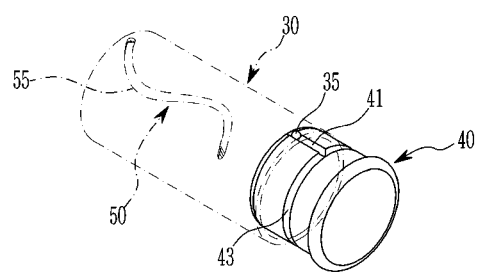
Figure 5B:
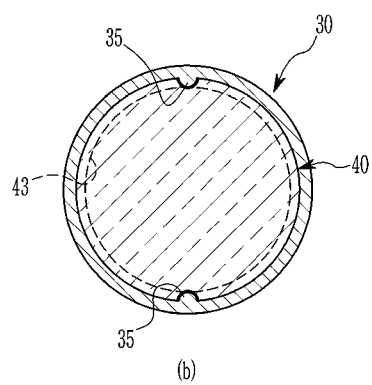
Figure 5C:
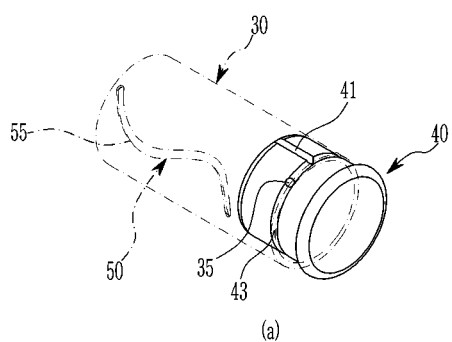
Figure 5C:
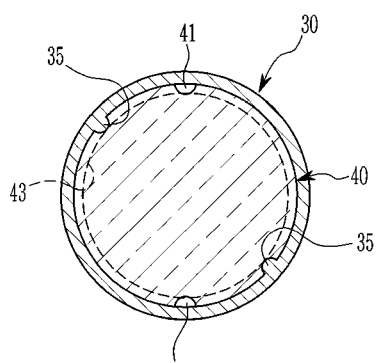

To rotatably couple the open end of the front side of the rotating cylinder 30 to the support bush 40, as illustrated in FIGS. 5A to 5C, the open end of the front side of the rotating cylinder 30 is provided with at least one protrusion 35 that is positioned on an inner circumferential surface of the rotating cylinder 30. The coupling protrusion 35 is a pair, and disposed on the inner circumferential surface of the rotating cylinder 30 at an interval of 180° and integrally mounted on the inner circumferential surface thereof. For example, the coupling protrusion 35 may be provided in a hemisphere form or may also be provided in a ball form.

Grooves 41 and 43 that are coupled to the coupling protrusion 35 are formed on an outer circumferential surface of the support bush 40. The grooves 41 and 43 include a first coupling groove 41 coupled to the coupling protrusion 35 in a front and rear direction, and a second coupling groove 43 connected to the first coupling groove 41 and coupled to the coupling protrusion 35 along an outer circumferential direction of the support bush 40.

Therefore, if the rotating cylinder 30 is pushed forward while the coupling protrusion 35 is coupled to the first coupling groove 41 of the support bush 40, the support bush 40 is coupled to the open end of the front side of the rotating cylinder 30.

If the rotating cylinder 30 rotates in one direction, the coupling protrusion 35 is coupled to the second coupling groove 43 along an outer circumferential direction. Therefore, the rotating cylinder 30 may freely rotate without being separated toward the rear side while being fixed to the support bush 40 by the coupling protrusion 35 coupled to the second coupling groove 43.

According to embodiments of the present disclosure, the follower unit 50 is for converting the linear motion of the connection link 20 into the rotational motion of the rotating cylinder 30 according to the front rotation of the pedal arm 10. The follower unit 50 is mounted on the rotating cylinder 30, and is slidably coupled to the other end of the front side of the connection link 20.

Figure 6:
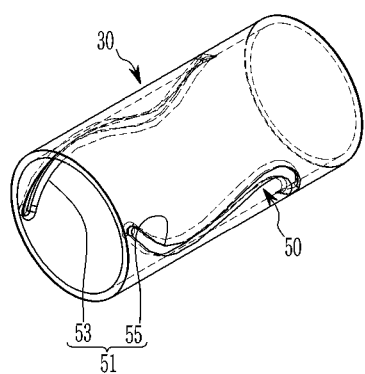
FIG. 6 is a diagram illustrating a follower unit applied to the pedal effort generation device for a vehicle according to embodiments of the present disclosure.
Figure 6:
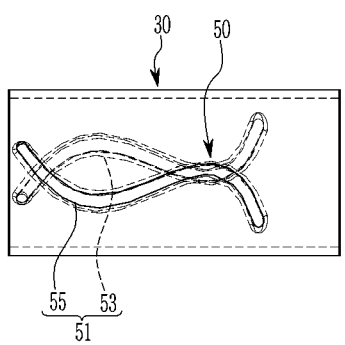

As illustrated in FIG. 6, the follower unit 50 includes geometry slots 51 that are each provided at both sides of the rotating cylinder 30 with a phase difference of 180°.

The geometry slot 51 is slidably coupled to both ends of the connection pin 31 of the other end of the front side of the connection link 20 as described above. Here, both sides of the rotating cylinder 30 may be defined as sides each corresponding to one side surface and the other side surface of the pedal member 1.

The geometry slot 51 is a cam follower of a cam mechanism and is formed as a generator having a curved pattern set between the end portion of the front side and the end portion of the rear side of the rotating cylinder 30, and includes a first slot 53 and a second slot 55.

The first slot 53 is bent upwardly from an end of the rear side of one side of the rotating cylinder 30, bent downwardly at a middle portion thereof, and again bent upwardly toward an end of the front side thereof.

The second slot 55 is bent downwardly from an end of the rear side of the other side of the rotating cylinder 30, bent upward at a middle portion thereof, and again bent downwardly toward an end of the front side thereof.

Both ends of the connection pin 32 fixed to the other end of the front side of the connection link 20 may be fitted in the first and second slots 53 and 55, fitted in the start end of the first and second slots 53 and 55, positioned at the end while being slid along the generator, and positioned at the start end while being slid along the generator from the end.

The geometry slot 51 as described above can be deformed to the generator having various curved patterns to be able to implement different pedal effort profiles according to the driver's preference. For example, the geometry slot 51 may be deformed to various curved patterns, such as smoothly changing a pedal effort, suddenly changing a pedal effort, and suddenly increasing a pedal effort at the end of the pedaling and implement different pedal effort profiles. However, according to embodiments of the present disclosure, the geometry slot 51 is not limited to any specific shape.

According to embodiments of the present disclosure, the elastic mechanism 60 is elastically deformed upon the forward rotation of the rotating cylinder 30 according to the front rotation of the pedal arm 10, and is for providing a reverse restoring force (i.e., elastic restoring force) to the rotating cylinder 30 and the pedal arm 10 with the accumulated elastic force.

Figure 7:
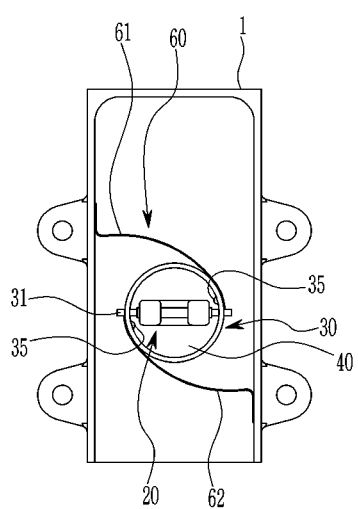
FIG. 7 is a diagram illustrating an elastic mechanism applied to the pedal effort generation device for a vehicle according to embodiments of the present disclosure.

The elastic mechanism 60 is mounted to be connected with the pedal member 1 and the rotating cylinder 30, and includes at least one of leaf springs 61 and 62 that accumulate an elastic force while being elastically deformed upon the forward rotation of the rotating cylinder 30. The leaf springs 61 and 62 include an upper leaf spring 61 and a lower leaf spring 62 as illustrated in FIG. 7 in embodiments of the present disclosure.

One end of the upper leaf spring 61 is connected with an upper part of one side surface of the pedal member 1 and the other end thereof is connected with one side of the rotating cylinder 30 corresponding to the other side surface of the pedal member 1, such that the upper leaf spring 61 is bent upwardly.

One end of the lower leaf spring 62 is connected with a lower part of the other side surface of the pedal member 1 and the other end thereof is connected with the other side of the rotating cylinder 30 corresponding to one side surface of the pedal member 1, such that the upper lower spring 61 is bent downwardly.

Here, one end of the upper leaf spring 61 and one end of the lower leaf spring 62 may be connected with the pedal member 1 by welding, rivet, and bolting, and the other end of the upper leaf spring 61 and the other end of the lower leaf spring 62 may be connected with the rotating cylinder 30 by welding, rivet, and bolting.

Figure 8:
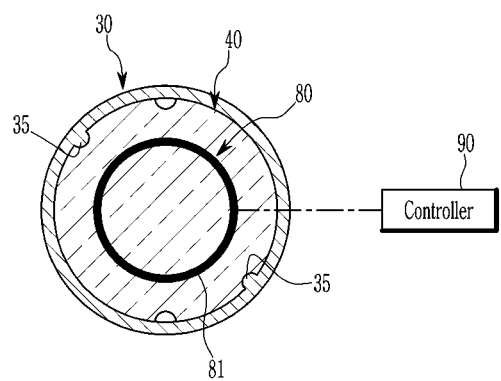
FIG. 8 is a diagram illustrating a sensor mounting structure applied to the pedal effort generation device for a vehicle according to embodiments of the present disclosure.

Meanwhile, the pedal effort generation device 100 for a vehicle according to embodiments of the present disclosure further includes a rotation angle detecting sensor 80 that detects a rotation angle of the rotating cylinder 30 and outputs the detection signal to a controller 90, as illustrated in FIG. 8.

The rotation angle detecting sensor 80 is mounted on the pedal member 1, and further mounted on the support bush 40 as described above. In embodiments of the present disclosure, the coupling protrusion 35 of the rotating cylinder 30 as described above is provided as a magnetic body including a magnet.

Here, since the coupling protrusion 35 is provided as the magnetic body, the coupling protrusion 35 rotates together with the rotating cylinder 30 to change a direction of magnetic field. The rotation angle detecting sensor 80 includes a hall sensor 81, in which the hall sensor 81 is packaged in a chip form and is fixedly mounted on the support bush 40. The hall sensor 81 includes a hole IC capable of measuring a rotation angle of the rotating cylinder 30 using a hall effect with a magnetic chain coupling protrusion 35.

The hole IC is a magnetic field measuring sensor and may detect a magnetic field of the coupling protrusion 35 that is changed by the rotation of the rotating cylinder 30, generate a current, and measure the rotation angle of the rotating cylinder 30 based on an output value of the current.

As described above, the pedal effort generation device 100 for a vehicle including the rotation angle detecting sensor 80 may be applied to the pedal unit of the electronic clutch (E-clutch) that operates the actuator with the electronic signal to operate the clutch.

The controller 90 may acquire the rotation angle of the rotating cylinder 30 by the hall sensor 81 and apply a clutch pedal effort signal corresponding thereto to the actuator.

Hereinafter, the operation of the pedal effort generation device 100 for a vehicle according to embodiments of the present disclosure will be described with reference to the drawings described above and the accompanying drawings.

Figure 9:
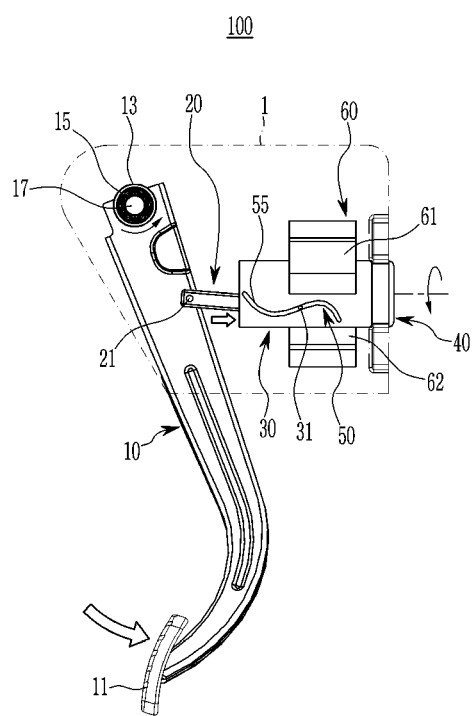
FIGS. 9 and 10 are diagrams for describing an operation of the pedal effort generation device for a vehicle according to embodiments of the present disclosure.
Figure 10:
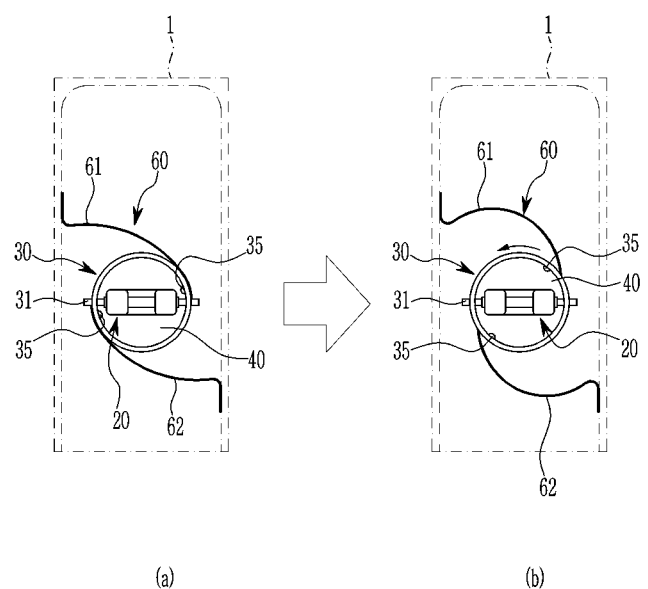

FIGS. 9 and 10 are diagrams for describing an operation of the pedal effort generation device for a vehicle according to embodiments of the present disclosure.

Referring first to FIG. 9, if a driver steps on the pedal pad 11 of the pedal arm 10, the pedal arm 10 rotates forward with respect to the hinge bush 15 and the hinge bolt 17 by the hinge pipe 13.

Therefore, since the connection link 20 is hinged to the pedal arm 10 by the hinge pin 21 and connected with the follower unit 50 of the rotating cylinder 30 by the connection pin 31, the connection link linearly moves forward.

Here, the connection link 20 linearly moves forward due to the front rotation of the pedal arm 10 while the connection pin 31 is fitted in the start ends of the first and second slots 53 and 55 of the geometry slot 51 of the follower unit 50.

In this case, the connection pin 31 slides from the start ends of the first and second slots 53 and 55 to the end side along the generator of the predetermined curved patterns of the first and second slots 53 and 55. Therefore, as the connection pin 31 slides along the first and second slots 53 and 55, the rotating cylinder 30 rotates forward as illustrated in FIG. 10.

At this time, the rotating cylinder 30 may freely rotate without being separated toward the rear side while being fixed to the support bush 40 by the coupling protrusion 35 coupled to the second coupling groove 43 of the support bush 40.

During this process, as the rotating cylinder 30 rotates forward, the upper leaf spring 61 of the elastic mechanism 60 is elastically deformed to be rounded upward and the lower leaf spring 62 is elastically deformed to be rounded downward.

Therefore, the upper leaf spring 61 and the lower leaf spring 62 provide the reverse restoring force (i.e., elastic restoring force) to the rotating cylinder 30 and the pedal arm 10 with the accumulated elastic force while being elastically deformed. By doing so, according to embodiments of the present disclosure, the pedal effort is provided to a driver's foot through the pedal arm 10 as the reverse restoring force acting on the pedal arm 10.

Meanwhile, if the driver's foot takes off the pedal pad 11 of the pedal arm 10, the rotating cylinder 30 is restored to an original position while rotating in a reverse direction by the elastic restoring force of the upper leaf spring 61 and the lower leaf spring 62.

During this process, the connection pin 31 slides from the end sides of the first and second slots 53 and 55 toward the start end sides along the generator of the predetermined curved pattern by the reverse restoring force, and the connection link 20 linearly moves backward. Therefore, the pedal arm 10 rotates backward from the front toward the rear by the connection link 20, and is restored to an original position.

On the other hand, according to embodiments of the present disclosure, when the pedal effort generation device 100 for a vehicle is applied to the pedal unit of the electronic clutch (E-clutch), as described above, the rotation angle detecting sensor 80 provided on the support bush 40 detects the rotation angle of the rotating cylinder 30 while the rotating cylinder 30 rotates forward and outputs the detection signal to the controller 90.

In this case, the coupling protrusion 35 as the magnetic body provided in the rotating cylinder 30 rotates together with the rotating cylinder 30, such that the direction of the magnetic field is changed. Therefore, the hall sensor 81 of the rotation angle detecting sensor 80 detects the magnetic field of the coupling protrusion 35 and generates a current, and measures the rotation angle of the rotating cylinder 30 based on the output value of the current and outputs the measured value to the controller 90.

The controller 90 may acquire the rotation angle of the rotating cylinder 30 by the hall sensor 81 and apply the clutch pedal effort signal corresponding thereto to the actuator of the electronic clutch.

According to the pedal effort generation device 100 for a vehicle according to embodiments of the present disclosure described up to now, the best pedal effort may be generated with the simple configuration including the connection link 20 and the rotating cylinder 30, thereby saving the manufacturing cost of the pedal unit.

In addition, according to embodiments of the present disclosure, the best pedal effort may be implemented by the generator of the geometry slot 51 provided in the rotating cylinder 30 to improve the operability of the pedal unit.

Further, according to embodiments of the present disclosure, the pedal effort profile can be simply changed according to the driver's preference by variously modifying the generator of the geometry slot 51 provided in the rotating cylinder 30, thereby improving the marketability of the pedal unit and providing the customized pedal only by the replacement of the rotating cylinder 30.

Even further, according to embodiments of the present disclosure, the rotation angle detecting sensor 80 may be applied to the support bush 40 to implement the position sensing of the pedal, thereby improving the layout and expanding vehicle application models employing the electronic clutch.

While this disclosure has been described in connection with certain embodiments, it is to be understood that the disclosure is not limited to the disclosed embodiments, but, on the contrary, is intended to cover various modifications and equivalent arrangements included within the spirit and scope of the appended claims.

What is claimed is:

1. A pedal effort generation device for a vehicle, comprising:
    a pedal arm rotatably mounted on a pedal member in a front and rear direction;
    a connection link having one end at a rear side of the connection link hinged to the pedal arm;
    a rotating cylinder connected with the other end of the connection link and rotatably mounted on the pedal member;
    a follower unit mounted on the rotating cylinder, slidably coupled to the other end of the connection link, and configured to convert linear motion of the connection link into rotational motion of the rotating cylinder according to a front rotation of the pedal arm; and
    an elastic mechanism connected with the pedal member and the rotating cylinder, elastically deformed upon a forward rotation of the rotating cylinder according to the front rotation of the pedal arm, and configured to provide a reverse restoring force to the rotating cylinder and the pedal arm with an accumulated elastic force,
    wherein the elastic mechanism includes:
        an upper leaf spring having one end connected with an upper part of one side of the pedal member and another end connected with one side of the rotating cylinder corresponding to the other side of the pedal member; and
        a lower leaf spring having one end connected with a lower part of the other side of the pedal member and another end connected with another side of the rotating cylinder corresponding to the one side of the pedal member.

2. The pedal effort generation device of claim 1, further comprising:
    a support bush fixedly mounted on the pedal member and rotatably supporting the rotating cylinder.

3. The pedal effort generation device of claim 2, wherein:
    the rotating cylinder has a cylinder shape with a front side and a rear side, ends of the front side and the rear side being open,
    the other end of the connection link is slidably coupled to the follower unit through the open end of the rear side of the rotating cylinder, and
    the open end of the front side of the rotating cylinder is rotatably coupled to the support bush.

4. The pedal effort generation device of claim 3, wherein:
    the open end of the front side of the rotating cylinder is provided with at least one coupling protrusion positioned on an inner circumferential surface of the rotating cylinder, and
    a groove coupled to the at least one coupling protrusion is formed on an outer circumferential surface of the support bush.

5. The pedal effort generation device of claim 4, wherein:
    the groove includes:
        a first coupling groove coupled to the at least one coupling protrusion in a front and rear direction; and
        a second coupling groove coupled to the at least one coupling protrusion along an outer circumferential direction of the support bush.

6. The pedal effort generation device of claim 1, wherein:
    the one end of the connection link is hinged to the pedal arm by a hinge pin, and
    the other end of the connection link is slidably coupled to the follower unit by a connection pin.

7. The pedal effort generation device of claim 6, wherein:
    the follower unit includes geometry slots each provided at front and rear sides of the rotating cylinder with a phase difference of 180° and slidably coupled to front and rear ends of the connection pin.

8. The pedal effort generation device of claim 7, wherein:
    the geometry slot is formed as a generator having a predetermined curved pattern between an end portion of the front side of the rotating cylinder and an end portion of the rear side of the rotating cylinder.

9. The pedal effort generation device of claim 7, wherein:
    the geometry slot includes:
        a first slot bent upwardly from an end of the rear side of the rotating cylinder, bent downwardly in a middle portion thereof, and again bent upwardly toward an end of the front side of the rotating cylinder, and
        a second slot bent downwardly from an end of the rear side of the rotating cylinder, bent upwardly in a middle portion thereof, and again bent downwardly toward an end of the front side of the rotating cylinder.

10. The pedal effort generation device of claim 1, wherein:
    the elastic mechanism includes at least one leaf spring accumulating an elastic force while being elastically deformed upon a forward rotation of the rotating cylinder.

11. The pedal effort generation device of claim 1, wherein:
    the upper leaf spring is bent upwardly, and the lower leaf spring is bent downwardly.

12. A pedal effort generation device for a vehicle, comprising:
    a pedal arm rotatably mounted on a pedal member in a front and rear direction;
    a connection link having one end at a rear side of the connection link hinged to the pedal arm;
    a rotating cylinder connected with the other end of the connection link and rotatably mounted on the pedal member;
    a follower unit mounted on the rotating cylinder, slidably coupled to the other end of the connection link, and configured to convert linear motion of the connection link into rotational motion of the rotating cylinder according to a front rotation of the pedal arm;
    an elastic mechanism connected with the pedal member and the rotating cylinder, elastically deformed upon a forward rotation of the rotating cylinder according to the front rotation of the pedal arm, and configured to provide a reverse restoring force to the rotating cylinder and the pedal arm with an accumulated elastic force;
    a rotation angle detecting sensor mounted on the pedal member, configured to detect a rotation angle of the rotating cylinder, and configured to output a detection signal to a controller;

a support bush fixedly mounted on the pedal member and rotatably supporting the rotating cylinder, wherein the rotating cylinder is provided with at least one coupling protrusion coupled to the support bush, the rotation angle detecting sensor is disposed on the support bush, and the at least one coupling protrusion is provided as a magnetic body.

13. The pedal effort generation device of claim 12, wherein:

the rotation angle detecting sensor includes a hall sensor.

14. The pedal effort generation device of claim 12, wherein:

the other end of the connection link is slidably coupled to the follower unit by a connection pin, the follower unit includes geometry slots each formed at front and rear sides of the rotating cylinder with a phase difference of 180°, and the geometry slots are slidably coupled to front and rear ends of the connection pin.

15. The pedal effort generation device of claim 12, wherein:

the elastic mechanism includes at least one leaf spring accumulating an elastic force while being elastically deformed upon the forward rotation of the rotating cylinder.

* * * * *